United States Patent [19]
Baydar et al.

[11] Patent Number: 5,134,614
[45] Date of Patent: Jul. 28, 1992

[54] SONET RECEIVE SIGNALING TRANSLATOR

[75] Inventors: Ertugrul Baydar; Timothy J. Williams, both of Raleigh, N.C.

[73] Assignee: Alcatel Network Systems, Inc., Richardson, Tex.

[21] Appl. No.: 350,591

[22] Filed: May 11, 1989

[51] Int. Cl.$^5$ .............................. H04J 3/12; H04J 3/24
[52] U.S. Cl. .............................. 370/94.1; 370/110.1; 370/84
[58] Field of Search .................... 370/110.1, 58.1, 58.2, 370/58.3, 60, 60.1, 94.1, 94.2, 94.3, 1, 84

[56] References Cited

U.S. PATENT DOCUMENTS 4,967,405 10/1990 Upp et al. .......................... 370/58.1

FOREIGN PATENT DOCUMENTS 0305992 3/1989 European Pat. Off. .

OTHER PUBLICATIONS

Proceedings IEEE Global Telecommunications Conference, Tokyo, 15-18, Nov. 1987, vol. 1, New York, US, pp. 485-489; "Synchronous Optical Network Format and Terminal Applications".
Proceedings Global Telecommunications Conference, Hollywood, Fla., 28 Nov.-1Dec. 1988, vol. 2, New York, pp. 980-986; N. B. Sandesara et al.,: "SONET Intra-Office Interconnect Signal".

*Primary Examiner*—Stephen Chin
*Assistant Examiner*—Wellington Chin
*Attorney, Agent, or Firm*—Ware, Fressola, Van Der Sluys & Adolphson

[57] ABSTRACT

The four signaling bits contained in the eight-bit SONET signaling bytes are read from the SONET signaling row and are converted to four parallel signaling bits for storage in a RAM in quasi-SONET format, with sets of four A, four B, four C and four D bits for four consecutive channels being stored for an even and an odd tributary in one RAM memory row. Storing sets of four of the same bit for four consecutive channels simplifies the RAM write operation. A read-modify-write system is used for updating the RAM storage, wherein a row of RAM is read, modified by eight new signaling bits from two consecutive SONET signaling bytes, and is rewritten into the RAM. New signaling bits are stored to accumulate eight new signaling bits for two tributaries prior to updating the RAM with the new bits for both tributaries. The 32 signaling bits output during a RAM read operation are selectively multiplexed to output only four bits associated with a particular channel.

17 Claims, 15 Drawing Sheets

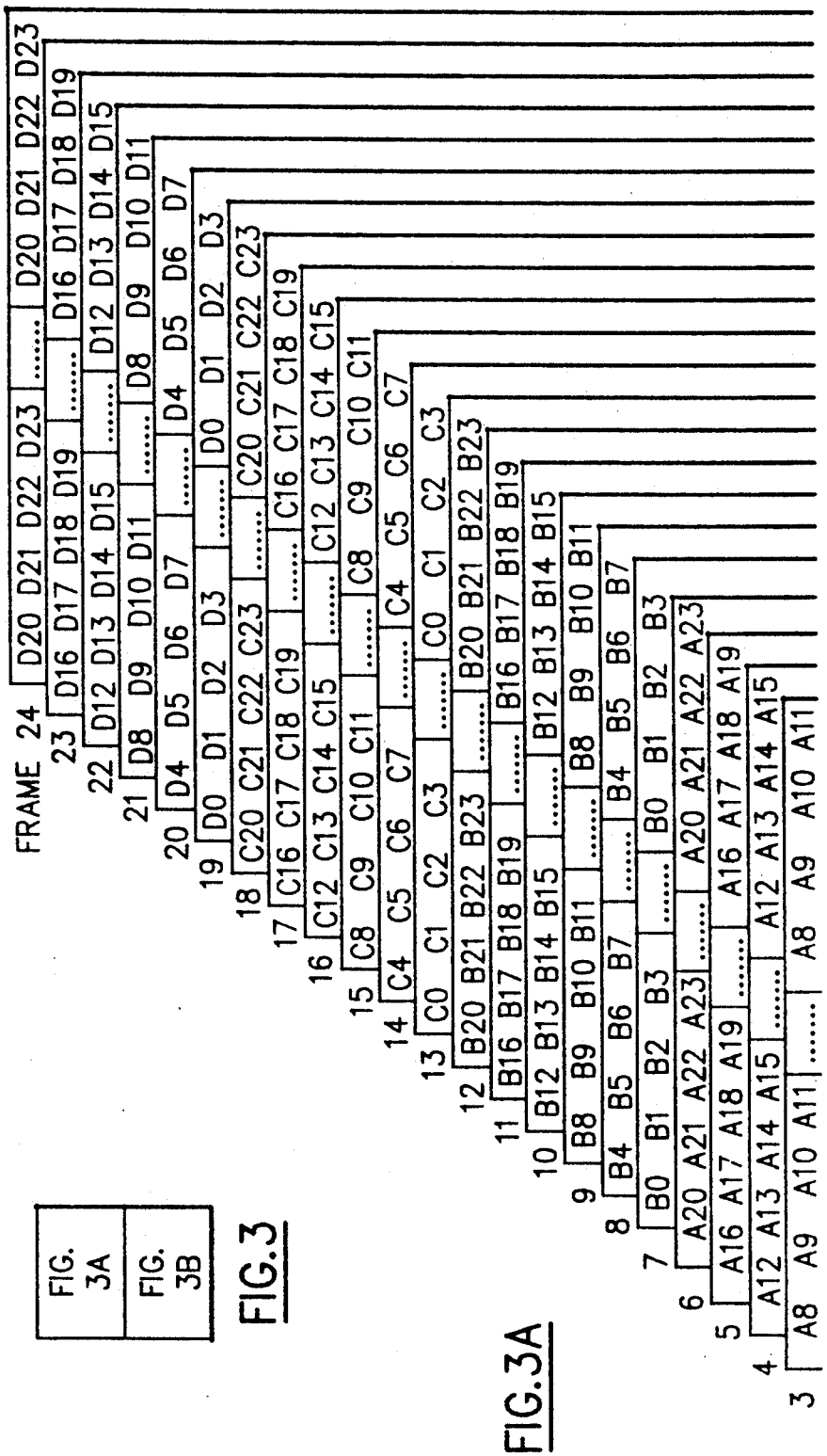

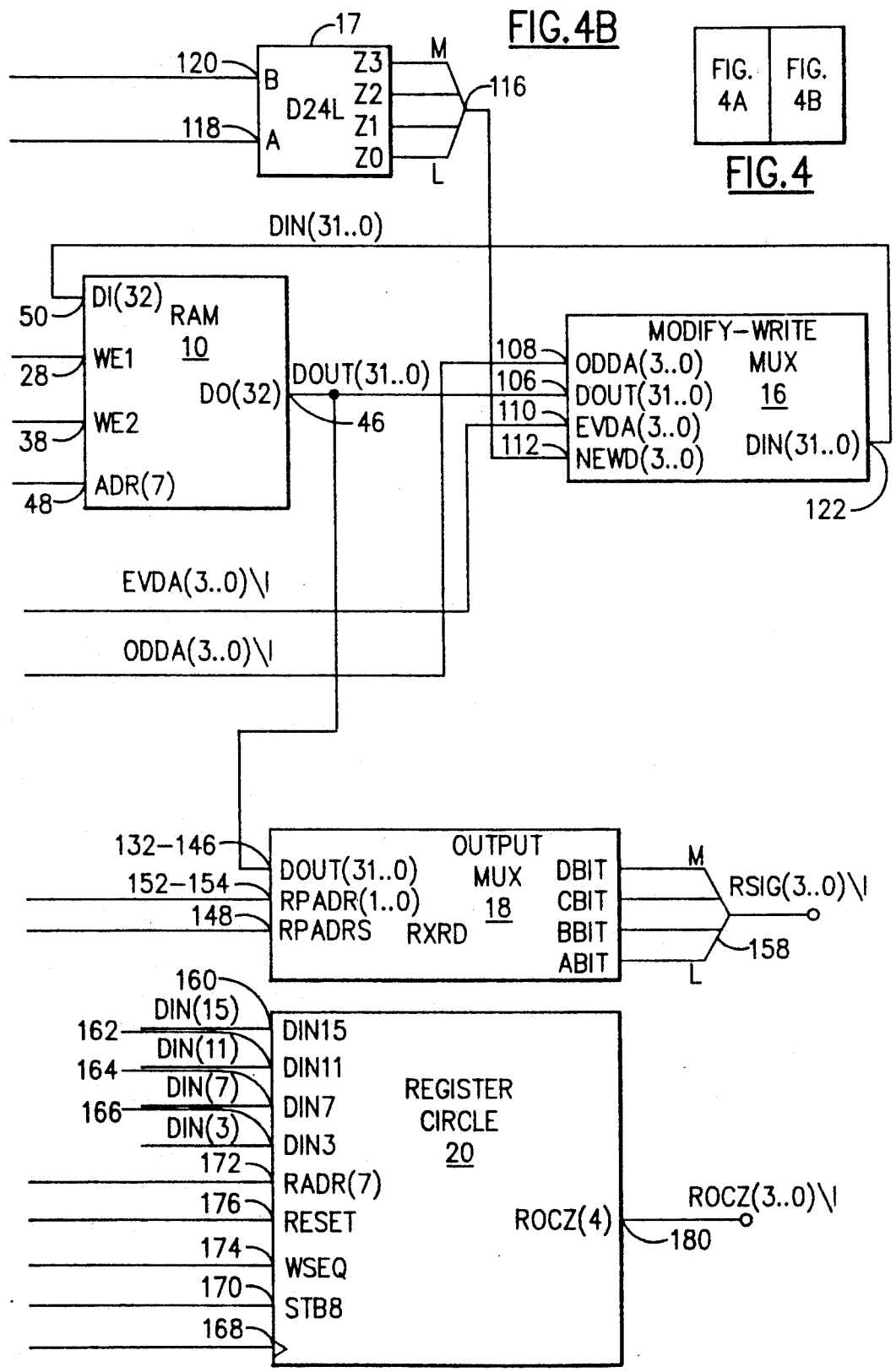

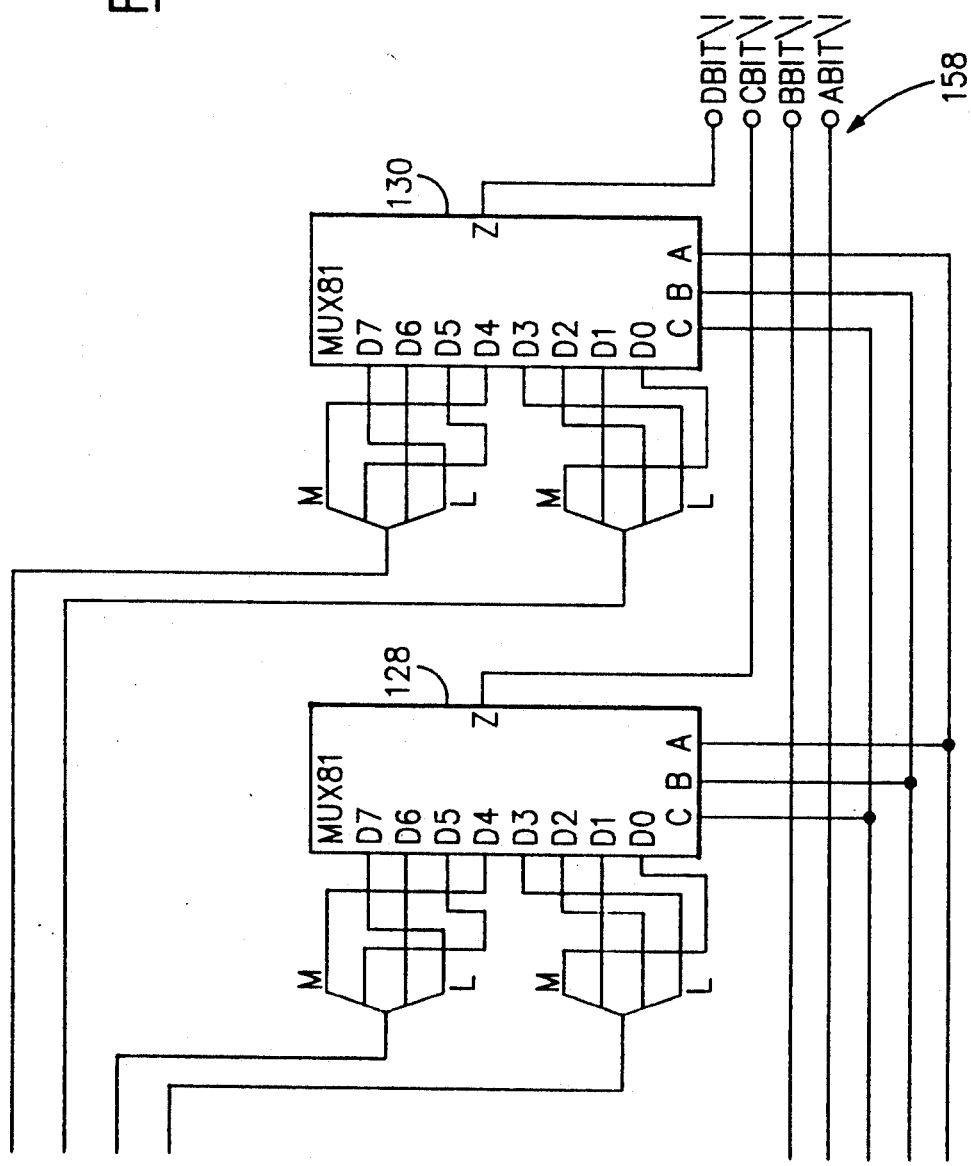

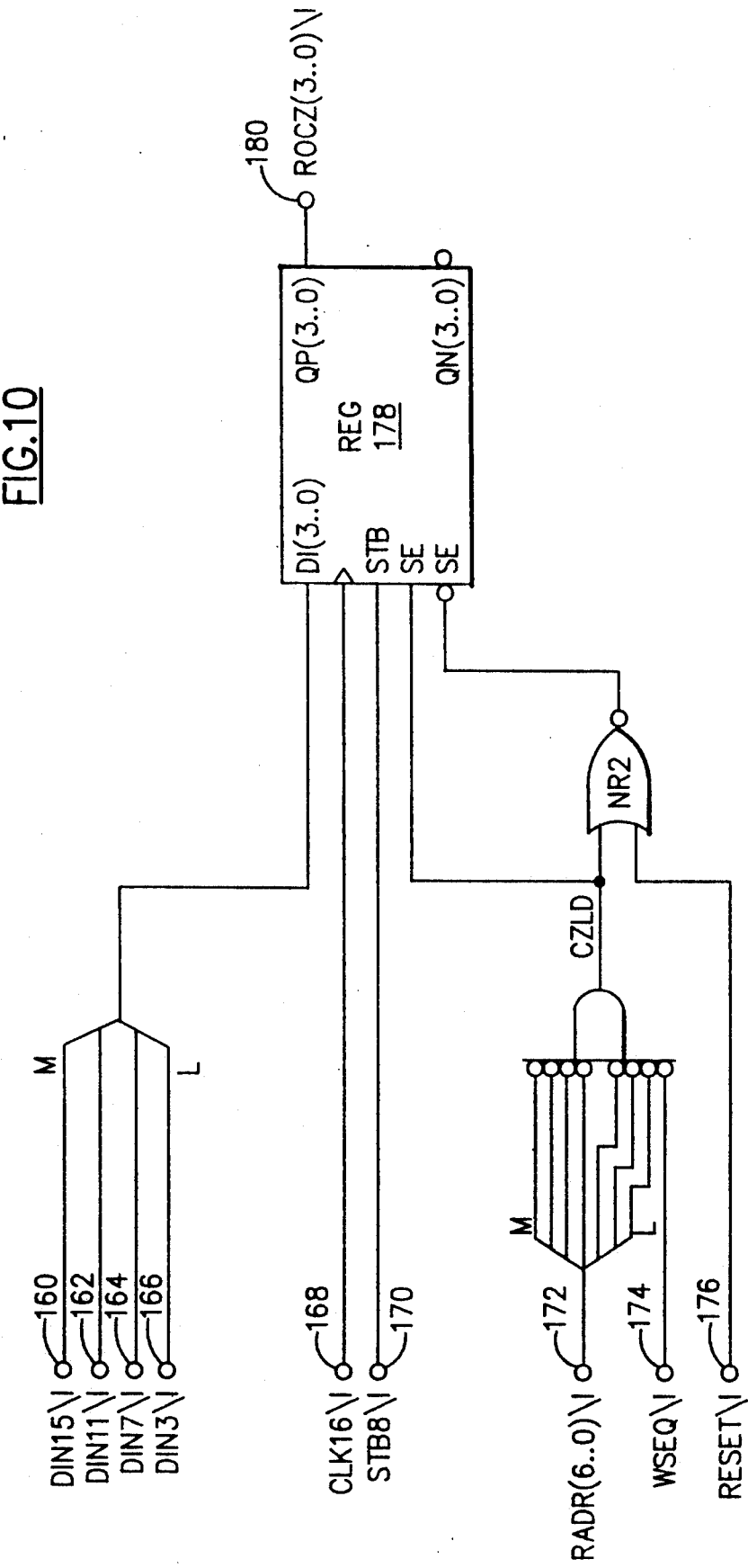

SONET RECEIVE SIGNALING TRANSLATOR

BACKGROUND OF THE INVENTION

1. Field of the Invention

The present invention relates to telephony signaling, and more particularly, to a device for translating SONET-formatted signaling to a signaling format wherein the signaling bits for each data channel can be associated with their corresponding data.

2. Description of the Prior Art

The American National Standard Institute, Inc. (ANSI) T1.105-1988 describes the Synchronous Optical Network (SONET) protocol for telecommunications equipment. This standard is incorporated herein by reference. The SONET protocol is particularly adapted for optical transmission, and various transmission levels have been standardized at specified line rates in M bit/s. The first level, Optical Carrier Level 1, or OC-1, transmits data at the rate of 51.84 M bits/s. This carrier level has a corresponding electrical level called Synchronous Transport Signal Level 1, or STS-1.

In order to access this high-frequency carrier level, access products are required so that lower bandwidth carriers can be introduced into or extracted from the STS-1 transmission level. These access products provide a SONET network with nodes where components of an STS-1 signal can be added to or dropped out of the main signal. The components that are extracted must be reorganized to produce a signal compatible with currentlyused telephony standards. A typical subcomponent of an STS-1 signal would be a DS1 signal having a bit rate of 1.544 M bits/s. Twenty-eight DS1 signals can be supported by an STS-1 carrier. Within the DS1 signal format, an additional 24 DSO 64K bits/s signals can be supported.

The SONET transmission is serial, comprising a total of 810 bytes. The frame structure for an STS-1 is shown in FIG. 1. The frame comprises 90 columns × 9 rows of bytes, with 8 bits per byte. The sequence of transmission of the bytes is row by row, from left to right. The frame is divided into three parts: the section and line overhead, which are contained in the first three columns; and the payload, which is found in the 87 remaining columns, which, in connection with the nine rows, forms a Synchronous Payload Envelope, SPE, which includes 783 bytes. The information within the SPE is transported in sub-STS-1 payloads called Virtual Tributaries, or VTs. There are several levels of VTs; however, it is only necessary to deal with a VT 1.5 for purposes of this invention. When the STS-1 payload supports 28 DS1 services, one VT at the 1.5 level is provided for each DS1 service.

FIG. 2 illustrates the payload mapping of bytes into a DS1.

An SPE consists of 783 bytes belonging to 28 tributaries, wherein each tributary can carry a DS1 payload, as illustrated in FIG. 2. A DS1 payload has 27 bytes, 24 of which carry DS0 channels. The first byte carries a VT pointer, or address; a second byte is unused; and the third byte carries signaling data for the DS1 payload, which data is relevant to the DS0 channels carried in the DS1 payload. Every channel has four signaling bits, namely A, B, C and D, as is well known in the telephony art. Thus, for a DS1 payload of 24 channels, a total of 96 signaling bits are required. Since only four bits of signaling are carried in each signaling byte and there is only one signaling byte per tributary or DS1, a total of 24 SONET frames would be required in order to provide the 96 required signaling bits.

FIG. 3 illustrates the transmission order of the payload contained within the SPEs of 24 SONET frames. For the sake of clarity, the first two rows of each SPE, which would contain bytes 1 and 2, as shown in FIG. 2, for each of the 28 tributaries, have been omitted. This facilitates the illustration in FIG. 3 of the signaling bits provided in each SPE byte. Thus, the first row of each frame shown in FIG. 3 is the signaling row and contains byte number 3 for each of the tributaries. The transmission order proceeds from left to right in each descending row of a frame. Thus, the signaling bits for tributaries 0-27 are first transmitted in sequence, after which the data for channels 0 for each tributary followed by the other channels through to the transmission of the data for channels 23.

Due to the presence of nine overhead bytes, not shown, bytes 1 and 2 of each tributary, and additional unused 'fixed stuff' bytes in the SPE, the signaling bytes start from SPE byte 60 and continue through byte 87. The content of each signaling byte is as follows:

| | (MSB) | | | Bit No. | | | | (LSB) |
|---|---|---|---|---|---|---|---|---|
| | 7 | 6 | 5 | 4 | 3 | 2 | 1 | 0 |
| Byte Sync | R | R | S1 | S2 | S3 | S4 | F | R |
| Bit Sync | 1 | 0 | R | R | R | R | F | R |
| R bits are not used | | | | | | | | |

In the above, S1, S2, S3 and S4 are the signaling bits corresponding to the sets of four bits shown in the signaling bytes in FIG. 3.

Thus, the signaling bits received in the SONET signaling row are received in the order of A bits, B bits, C bits and D bits, which bits are not easily associated with their corresponding channel data. Thus, a system was required to re-associate the signaling with the proper channels and to store the signaling so that it is readily accessible during any internal system byte time. Thus, a storage of 2,688 signaling bits was required, with the bits arriving as shown in FIG. 3, while the storage was required to have an output format wherein the A,B,C and D bits of each channel could be accessed simultaneously without difficulty. Such a storage requirement created significant design problems, due to the large amount of storage required and the incompatible nature of the write bit addressing requirements and the read bit addressing requirements. If such a design were implemented in a full custom RAM, with independent bit write address and byte read address, design costs and schedule impacts would have been unacceptable.

It would have been possible to design the function using latches and independent read and write address decoders, but the latches alone would have consumed a significant amount of the limited surface area in the semi-conductor devices used to implement the system.

SUMMARY OF THE INVENTION

The present invention contemplates a signaling translator that translates the signaling contained in 8-bit SONET bytes to sets of four ABCD signaling bits each associated with a particular channel for use in a 16-bit internal data byte, as described hereinafter. The signaling bits are read from the SONET signaling row, stored and read from storage for association with the channels data bytes, using four outband bit positions. All 2688 stored signaling bits are accessible for use in every frame for readout and association with a channel; however, only 112 signaling bits are updated in a given frame.

Due to the high speed at which the SONET data is received, a read-modify-write control system is utilized for updating the bits stored in a RAM. The design is implemented in a gate array incorporating a 96×32 bit RAM with separate input and output data buses. A multiplexing scheme used in conjunction with a pre-store latch facilitates the use of a read-modify-write cycle, with new signaling data (8 bits) from two DS1s or tributaries to be combined with stored data from the corresponding channels of the two DS1s for updating. The signaling is stored in the RAM in quasi-SONET format, i.e., in sets of four A, B, C or D bits, as shown in FIG. 3, to simplify the write operation; however, the sets of A, B, C and D bits are associated together for each tributary. The four sets of bits for two consecutively-numbered tributaries are stored in one row of the RAM. Thus, one row address will access bits for an odd- and an even-numbered tributary.

The basic architecture can be applied to narrower data widths. The width is primarily determined by the specification, such as propagation delay, set-up and hold time of the RAM.

A primary objective of the present invention is to provide an interface for a SONET STS-1 transmission line.

Another objective of the present invention is to provide a device which extracts signaling from the SONET format and makes it available for association with the appropriate channels.

Another objective of the present invention is to store received SONET signaling so that it is available during every byte time for association with channel data.

Another objective of the present invention is to update the stored signaling as it is received from the SONET format.

Another objective of the present invention is to provide a means for storing signaling bits and to update said stored bits with a minimum amount of storage capacity.

Another objective of the present invention is to provide a signaling translation device using a gate array with internal standard-sized Random Access Memories (RAMs).

DESCRIPTION OF THE DRAWINGS

FIG. 10 is a schematic diagram of a register circuit.

DESCRIPTION OF THE INVENTION

Figure 4A:
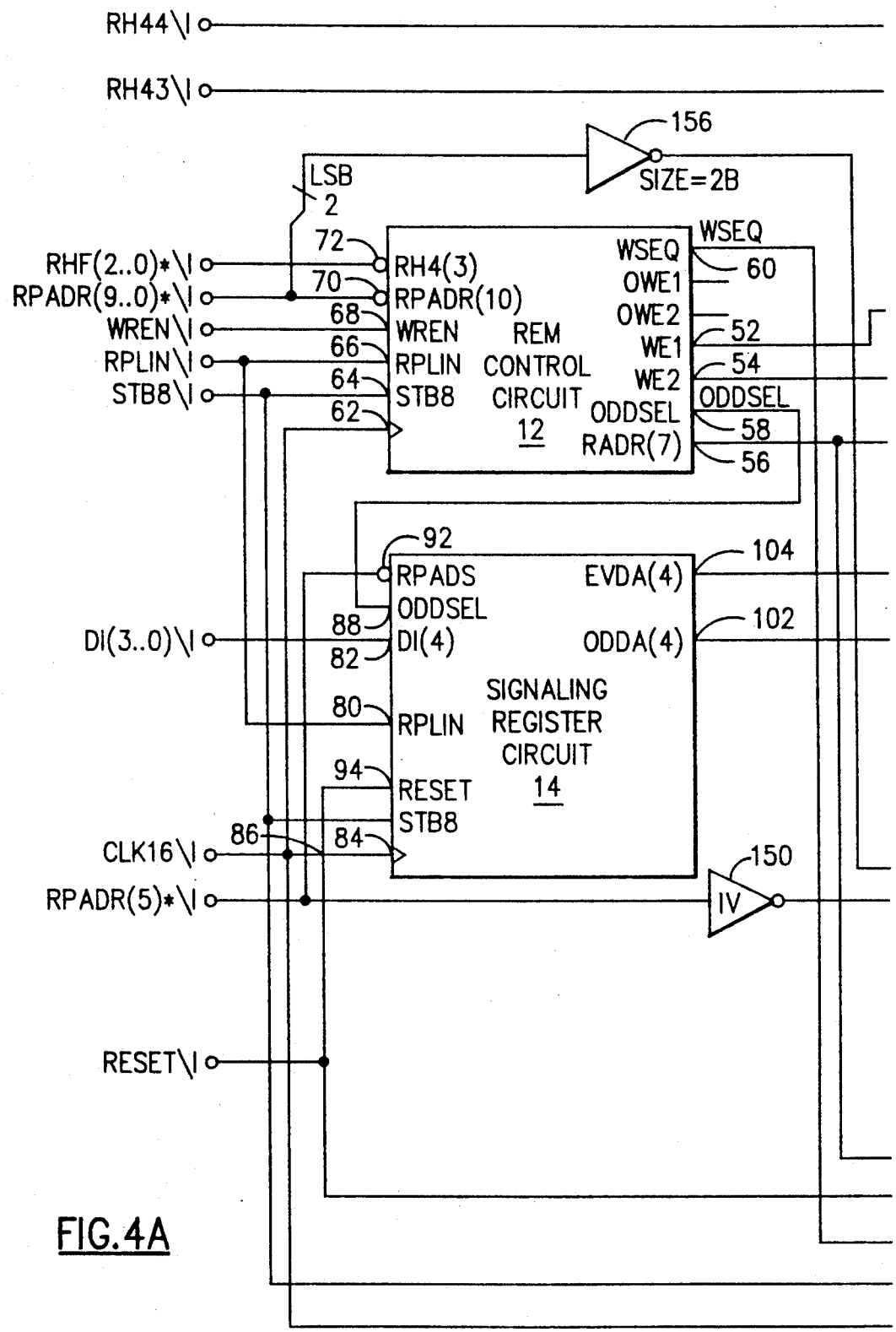
FIG. 4 shows FIGS. 4A and 4B together, which is a block diagram showing the present invention.

FIG. 4 shows a block diagram of a SONET receive signaling translator constructed in accordance with the present invention. The SONET information is transmitted serially. The signaling is extracted from the SONET frame in four bit sets, as previously shown, at timed intervals and is thereafter presented as four parallel signaling bits. The signaling is stored in RAM and outputted as four bits representing the A, B, C and D signaling bits for a particular channel, which bits may be then associated with the channel data by inserting the bits in a 16-bit byte in four outband bit positions.

The circuit of FIG. 4 includes a 96×32 bit Random Access Memory (RAM) 10, a RAM controller 12, a signaling register circuit 14, a modify-write multiplexer circuit 16, a frame decoder 17, an output multiplexer 18, and a register circuit 20 for storing tributary 0, channel 0 signaling.

RAM 10 is configured as 96 locations, each 32 bits wide, for the received signaling translation. A multiplexing scheme is used in conjunction with a pre-store register to perform a read-modify-write cycle, with new signaling for four channels on each of two tributaries being combined with the stored signaling for the corresponding channels for updating. The signaling is stored in the RAM in the SONET-assigned form, so that four similar type bits, such as A bits, are stored adjacent each other, for four sequential channels of a tributary. Each RAM address stores the signaling information for four channels of two tributaries. Thus, each row of the RAM stores four A bits, four B bits, four C bits, and four D bits for one even-numbered tributary and four A bits, four B bits, four C bits and four D bits for an odd-numbered tributary. During the writing to the RAM, eight signaling bits for two tributaries are stored in registers and transferred to the RAM at the same time, so that every read-modify-write operation can be performed in two address cycles The RAM configuration is as shown in Table 1, with addresses, such as address 0, representing a single 32-bit row of the RAM for storing the signaling bits for channels 0-3 of tributaries 0 and 1.

TABLE 1

| | RX SIGNALING RAM CONFIGURATION | | | | |
|---|---|---|---|---|---|
| Address | Bit 0-3 (Bit 16-19) | Bit 4-7 (Bit 20-23) | Bit 8-11 (Bit 24-27) | Bit 12-15 (Bit 28-31) | Tributary No: |
| 0 | A0-A3 | B0-B3 | C0-C3 | D0-D3 | Tributary 0 |
| 0 | A0-A3 | B0-B3 | C0-C3 | D0-D3 | Tributary 1 |
| 1 | A0-A3 | B0-B3 | C0-C3 | D0-D3 | Tributary 2 |
| 1 | A0-A3 | B0-B3 | C0-C3 | D0-D3 | Tributary 3 |
| 2 | A0-A3 | B0-B3 | C0-C3 | D0-D3 | Tributary 4 |
| 2 | A0-A3 | B0-B3 | C0-C3 | D0-D3 | Tributary 5 |
| 3 | A0-A3 | B0-B3 | C0-C3 | D0-D3 | Tributary 6 |

TABLE 1-continued
RX SIGNALING RAM CONFIGURATION

| Address | Bit 0-3 (Bit 16-19) | Bit 4-7 (Bit 20-23) | Bit 8-11 (Bit 24-27) | Bit 12-15 (Bit 28-31) | Tributary No: |
|---|---|---|---|---|---|
| 3 | A0-A3 | B0-B3 | C0-C3 | D0-D3 | Tributary 7 |
| 4 | A0-A3 | B0-B3 | C0-C3 | D0-D3 | Tributary 8 |
| 4 | A0-A3 | B0-B3 | C0-C3 | D0-D3 | Tributary 9 |
| 5 | A0-A3 | B0-B3 | C0-C3 | D0-D3 | Tributary 10 |
| 5 | A0-A3 | B0-B3 | C0-C3 | D0-D3 | Tributary 11 |
| 6 | A0-A3 | B0-B3 | C0-C3 | D0-D3 | Tributary 12 |
| 6 | A0-A3 | B0-B3 | C0-C3 | D0-D3 | Tributary 13 |
| 7 | A0-A3 | B0-B3 | C0-C3 | D0-D3 | Tributary 14 |
| 7 | A0-A3 | B0-B3 | C0-C3 | D0-D3 | Tributary 15 |
| 8 | A0-A3 | B0-B3 | C0-C3 | D0-D3 | Tributary 16 |
| 8 | A0-A3 | B0-B3 | C0-C3 | D0-D3 | Tributary 17 |
| 9 | A0-A3 | B0-B3 | C0-C3 | D0-D3 | Tributary 18 |
| 9 | A0-A3 | B0-B3 | C0-C3 | D0-D3 | Tributary 19 |
| 10 | A0-A3 | B0-B3 | C0-C3 | D0-D3 | Tributary 20 |
| 10 | A0-A3 | B0-B3 | C0-C3 | D0-D3 | Tributary 21 |
| 11 | A0-A3 | B0-B3 | C0-C3 | D0-D3 | Tributary 22 |
| 11 | A0-A3 | B0-B3 | C0-C3 | D0-D3 | Tributary 23 |
| 12 | A0-A3 | B0-B3 | C0-C3 | D0-D3 | Tributary 24 |
| 12 | A0-A3 | B0-B3 | C0-C3 | D0-D3 | Tributary 25 |
| 13 | A0-A3 | B0-B3 | C0-C3 | D0-D3 | Tributary 26 |
| 13 | A0-A3 | B0-B3 | C0-C3 | D0-D3 | Tributary 27 |
| 14 | — | — | — | — | |
| 15 | — | — | — | — | |
| 16 | A4-A7 | B4-B7 | C4-C7 | D4-D7 | Tributary 0 |
| 16 | A4-A7 | B4-B7 | C4-C7 | D4-D7 | Tributary 1 |
| 17 | A4-A7 | B4-B7 | C4-C7 | D4-D7 | Tributary 2 |
| 17 | A4-A7 | B4-B7 | C4-C7 | D4-D7 | Tributary 3 |
| 18 | A4-A7 | B4-B7 | C4-C7 | D4-D7 | Tributary 4 |
| 18 | A4-A7 | B4-B7 | C4-C7 | D4-D7 | Tributary 5 |
| 19 | A4-A7 | B4-B7 | C4-C7 | D4-D7 | Tributary 6 |
| 19 | A4-A7 | B4-B7 | C4-C7 | D4-D7 | Tributary 7 |
| 20 | A4-A7 | B4-B7 | C4-C7 | D4-D7 | Tributary 8 |
| 20 | A4-A7 | B4-B7 | C4-C7 | D4-D7 | Tributary 9 |
| 21 | A4-A7 | B4-B7 | C4-C7 | D4-D7 | Tributary 10 |
| 21 | A4-A7 | B4-B7 | C4-C7 | D4-D7 | Tributary 11 |
| 22 | A4-A7 | B4-B7 | C4-C7 | D4-D7 | Tributary 12 |
| 22 | A4-A7 | B4-B7 | C4-C7 | D4-D7 | Tributary 13 |
| 23 | A4-A7 | B4-B7 | C4-C7 | D4-D7 | Tributary 14 |
| 23 | A4-A7 | B4-B7 | C4-C7 | D4-D7 | Tributary 15 |
| 24 | A4-A7 | B4-B7 | C4-C7 | D4-D7 | Tributary 16 |
| 24 | A4-A7 | B4-B7 | C4-C7 | D4-D7 | Tributary 17 |
| 25 | A4-A7 | B4-B7 | C4-C7 | D4-D7 | Tributary 18 |
| 25 | A4-A7 | B4-B7 | C4-C7 | D4-D7 | Tributary 19 |
| 26 | A4-A7 | B4-B7 | C4-C7 | D4-D7 | Tributary 20 |
| 26 | A4-A7 | B4-B7 | C4-C7 | D4-D7 | Tributary 21 |
| 27 | A4-A7 | B4-B7 | C4-C7 | D4-D7 | Tributary 22 |
| 27 | A4-A7 | B4-B7 | C4-C7 | D4-D7 | Tributary 23 |
| 28 | A4-A7 | B4-B7 | C4-C7 | D4-D7 | Tributary 24 |
| 28 | A4-A7 | B4-B7 | C4-C7 | D4-D7 | Tributary 25 |
| 29 | A4-A7 | B4-B7 | C4-C7 | D4-D7 | Tributary 26 |
| 29 | A4-A7 | B4-B7 | C4-C7 | D4-D7 | Tributary 27 |
| 30 | — | — | — | — | |
| 31 | — | — | — | — | |
| 32 | A8-A11 | B8-B11 | C8-C11 | D8-D11 | Tributary 0 |
| 32 | A8-A11 | B8-B11 | C8-C11 | D8-D11 | Tributary 1 |
| 33 | A8-A11 | B8-B11 | C8-C11 | D8-D11 | Tributary 2 |
| 33 | A8-A11 | B8-B11 | C8-C11 | D8-D11 | Tributary 3 |
| 34 | A8-A11 | B8-B11 | C8-C11 | D8-D11 | Tributary 4 |
| 34 | A8-A11 | B8-B11 | C8-C11 | D8-D11 | Tributary 5 |
| 35 | A8-A11 | B8-B11 | C8-C11 | D8-D11 | Tributary 6 |
| 35 | A8-A11 | B8-B11 | C8-C11 | D8-D11 | Tributary 7 |
| 36 | A8-A11 | B8-B11 | C8-C11 | D8-D11 | Tributary 8 |
| 36 | A8-A11 | B8-B11 | C8-C11 | D8-D11 | Tributary 9 |
| 37 | A8-A11 | B8-B11 | C8-C11 | D8-D11 | Tributary 10 |
| 37 | A8-A11 | B8-B11 | C8-C11 | D8-D11 | Tributary 11 |
| 38 | A8-A11 | B8-B11 | C8-C11 | D8-D11 | Tributary 12 |
| 38 | A8-A11 | B8-B11 | C8-C11 | D8-D11 | Tributary 13 |
| 39 | A8-A11 | B8-B11 | C8-C11 | D8-D11 | Tributary 14 |
| 39 | A8-A11 | B8-B11 | C8-C11 | D8-D11 | Tributary 15 |
| 40 | A8-A11 | B8-B11 | C8-C11 | D8-D11 | Tributary 16 |
| 40 | A8-A11 | B8-B11 | C8-C11 | D8-D11 | Tributary 17 |
| 41 | A8-A11 | B8-B11 | C8-C11 | D8-D11 | Tributary 18 |
| 41 | A8-A11 | B8-B11 | C8-C11 | D8-D11 | Tributary 19 |
| 42 | A8-A11 | B8-B11 | C8-C11 | D8-D11 | Tributary 20 |
| 42 | A8-A11 | B8-B11 | C8-C11 | D8-D11 | Tributary 21 |
| 43 | A8-A11 | B8-B11 | C8-C11 | D8-D11 | Tributary 22 |
| 43 | A8-A11 | B8-B11 | C8-C11 | D8-D11 | Tributary 23 |
| 44 | A8-A11 | B8-B11 | C8-C11 | D8-D11 | Tributary 24 |
| 44 | A8-A11 | B8-B11 | C8-C11 | D8-D11 | Tributary 25 |

TABLE 1-continued

RX SIGNALING RAM CONFIGURATION

| Address | Bit 0-3 (Bit 16-19) | Bit 4-7 (Bit 20-23) | Bit 8-11 (Bit 24-27) | Bit 12-15 (Bit 28-31) | Tributary No: |
|---|---|---|---|---|---|
| 45 | A8-A11 | B8-B11 | C8-C11 | D8-D11 | Tributary 26 |
| 45 | A8-A11 | B8-B11 | C8-C11 | D8-D11 | Tributary 27 |
| 46 | — | — | — | — | |
| 47 | — | — | — | — | |
| 48 | A12-A15 | B12-B15 | C12-C15 | D12-D15 | Tributary 0 |
| 48 | A12-A15 | B12-B15 | C12-C15 | D12-D15 | Tributary 1 |
| 49 | A12-A15 | B12-B15 | C12-C15 | D12-D15 | Tributary 2 |
| 49 | A12-A15 | B12-B15 | C12-C15 | D12-D15 | Tributary 3 |
| 50 | A12-A15 | B12-B15 | C12-C15 | D12-D15 | Tributary 4 |
| 50 | A12-A15 | B12-B15 | C12-C15 | D12-D15 | Tributary 5 |
| 51 | A12-A15 | B12-B15 | C12-C15 | D12-D15 | Tributary 6 |
| 51 | A12-A15 | B12-B15 | C12-C15 | D12-D15 | Tributary 7 |
| 52 | A12-A15 | B12-B15 | C12-C15 | D12-D15 | Tributary 8 |
| 52 | A12-A15 | B12-B15 | C12-C15 | D12-D15 | Tributary 9 |
| 53 | A12-A15 | B12-B15 | C12-C15 | D12-D15 | Tributary 10 |
| 53 | A12-A15 | B12-B15 | C12-C15 | D12-D15 | Tributary 11 |
| 54 | A12-A15 | B12-B15 | C12-C15 | D12-D15 | Tributary 12 |
| 54 | A12-A15 | B12-B15 | C12-C15 | D12-D15 | Tributary 13 |
| 55 | A12-A15 | B12-B15 | C12-C15 | D12-D15 | Tributary 14 |
| 55 | A12-A15 | B12-B15 | C12-C15 | D12-D15 | Tributary 15 |
| 56 | A12-A15 | B12-B15 | C12-C15 | D12-D15 | Tributary 16 |
| 56 | A12-A15 | B12-B15 | C12-C15 | D12-D15 | Tributary 17 |
| 57 | A12-A15 | B12-B15 | C12-C15 | D12-D15 | Tributary 18 |
| 57 | A12-A15 | B12-B15 | C12-C15 | D12-D15 | Tributary 19 |
| 58 | A12-A15 | B12-B15 | C12-C15 | D12-D15 | Tributary 20 |
| 58 | A12-A15 | B12-B15 | C12-C15 | D12-D15 | Tributary 21 |
| 59 | A12-A15 | B12-B15 | C12-C15 | D12-D15 | Tributary 22 |
| 59 | A12-A15 | B12-B15 | C12-C15 | D12-D15 | Tributary 23 |
| 60 | A12-A15 | B12-B15 | C12-C15 | D12-D15 | Tributary 24 |
| 60 | A12-A15 | B12-B15 | C12-C15 | D12-D15 | Tributary 25 |
| 61 | A12-A15 | B12-B15 | C12-C15 | D12-D15 | Tributary 26 |
| 61 | A12-A15 | B12-B15 | C12-C15 | D12-D15 | Tributary 27 |
| 62 | — | — | — | — | |
| 63 | — | — | — | — | |
| 64 | A16-A19 | B16-B19 | C16-C19 | D16-D19 | Tributary 0 |
| 64 | A16-A19 | B16-B19 | C16-C19 | D16-D19 | Tributary 1 |
| 65 | A16-A19 | B16-B19 | C16-C19 | D16-D19 | Tributary 2 |
| 65 | A16-A19 | B16-B19 | C16-C19 | D16-D19 | Tributary 3 |
| 66 | A16-A19 | B16-B19 | C16-C19 | D16-D19 | Tributary 4 |
| 66 | A16-A19 | B16-B19 | C16-C19 | D16-D19 | Tributary 5 |
| 67 | A16-A19 | B16-B19 | C16-C19 | D16-D19 | Tributary 6 |
| 67 | A16-A19 | B16-B19 | C16-C19 | D16-D19 | Tributary 7 |
| 68 | A16-A19 | B16-B19 | C16-C19 | D16-D19 | Tributary 8 |
| 68 | A16-A19 | B16-B19 | C16-C19 | D16-D19 | Tributary 9 |
| 69 | A16-A19 | B16-B19 | C16-C19 | D16-D19 | Tributary 10 |
| 69 | A16-A19 | B16-B19 | C16-C19 | D16-D19 | Tributary 11 |
| 70 | A16-A19 | B16-B19 | C16-C19 | D16-D19 | Tributary 12 |
| 70 | A16-A19 | B16-B19 | C16-C19 | D16-D19 | Tributary 13 |
| 71 | A16-A19 | B16-B19 | C16-C19 | D16-D19 | Tributary 14 |
| 71 | A16-A19 | B16-B19 | C16-C19 | D16-D19 | Tributary 15 |
| 72 | A16-A19 | B16-B19 | C16-C19 | D16-D19 | Tributary 16 |
| 72 | A16-A19 | B16-B19 | C16-C19 | D16-D19 | Tributary 17 |
| 73 | A16-A19 | B16-B19 | C16-C19 | D16-D19 | Tributary 18 |
| 73 | A16-A19 | B16-B19 | C16-C19 | D16-D19 | Tributary 19 |
| 74 | A16-A19 | B16-B19 | C16-C19 | D16-D19 | Tributary 20 |
| 74 | A16-A19 | B16-B19 | C16-C19 | D16-D19 | Tributary 21 |
| 75 | A16-A19 | B16-B19 | C16-C19 | D16-D19 | Tributary 22 |
| 75 | A16-A19 | B16-B19 | C16-C19 | D16-D19 | Tributary 23 |
| 76 | A16-A19 | B16-B19 | C16-C19 | D16-D19 | Tributary 24 |
| 76 | A16-A19 | B16-B19 | C16-C19 | D16-D19 | Tributary 25 |
| 77 | A16-A19 | B16-B19 | C16-C19 | D16-D19 | Tributary 26 |
| 77 | A16-A19 | B16-B19 | C16-C19 | D16-D19 | Tributary 27 |
| 78 | — | — | — | — | |
| 79 | — | — | — | — | |
| 80 | A20-A23 | B20-B23 | C20-C23 | D20-D23 | Tributary 0 |
| 80 | A20-A23 | B20-B23 | C20-C23 | D20-D23 | Tributary 1 |
| 81 | A20-A23 | B20-B23 | C20-C23 | D20-D23 | Tributary 2 |
| 81 | A20-A23 | B20-B23 | C20-C23 | D20-D23 | Tributary 3 |
| 82 | A20-A23 | B20-B23 | C20-C23 | D20-D23 | Tributary 4 |
| 82 | A20-A23 | B20-B23 | C20-C23 | D20-D23 | Tributary 5 |
| 83 | A20-A23 | B20-B23 | C20-C23 | D20-D23 | Tributary 6 |
| 83 | A20-A23 | B20-B23 | C20-C23 | D20-D23 | Tributary 7 |
| 84 | A20-A23 | B20-B23 | C20-C23 | D20-D23 | Tributary 8 |
| 84 | A20-A23 | B20-B23 | C20-C23 | D20-D23 | Tributary 9 |
| 85 | A20-A23 | B20-B23 | C20-C23 | D20-D23 | Tributary 10 |
| 85 | A20-A23 | B20-B23 | C20-C23 | D20-D23 | Tributary 11 |
| 86 | A20-A23 | B20-B23 | C20-C23 | D20-D23 | Tributary 12 |
| 86 | A20-A23 | B20-B23 | C20-C23 | D20-D23 | Tributary 13 |
| 87 | A20-A23 | B20-B23 | C20-C23 | D20-D23 | Tributary 14 |

TABLE 1-continued
RX SIGNALING RAM CONFIGURATION

| Address | Bit 0-3 (Bit 16-19) | Bit 4-7 (Bit 20-23) | Bit 8-11 (Bit 24-27) | Bit 12-15 (Bit 28-31) | Tributary No: |
|---|---|---|---|---|---|
| 87 | A20-A23 | B20-B23 | C20-C23 | D20-D23 | Tributary 15 |
| 88 | A20-A23 | B20-B23 | C20-C23 | D20-D23 | Tributary 16 |
| 88 | A20-A23 | B20-B23 | C20-C23 | D20-D23 | Tributary 17 |
| 89 | A20-A23 | B20-B23 | C20-C23 | D20-D23 | Tributary 18 |
| 89 | A20-A23 | B20-B23 | C20-C23 | D20-D23 | Tributary 19 |
| 90 | A20-A23 | B20-B23 | C20-C23 | D20-D23 | Tributary 20 |
| 90 | A20-A23 | B20-B23 | C20-C23 | D20-D23 | Tributary 21 |
| 91 | A20-A23 | B20-B23 | C20-C23 | D20-D23 | Tributary 22 |
| 91 | A20-A23 | B20-B23 | C20-C23 | D20-D23 | Tributary 23 |
| 92 | A20-A23 | B20-B23 | C20-C23 | D20-D23 | Tributary 24 |
| 92 | A20-A23 | B20-B23 | C20-C23 | D20-D23 | Tributary 25 |
| 93 | A20-A23 | B20-B23 | C20-C23 | D20-D23 | Tributary 26 |
| 93 | A20-A23 | B20-B23 | C20-C23 | D20-D23 | Tributary 27 |
| 94 | — | — | — | — | |
| 95 | — | — | — | — | |

The write addresses are generated based on the signaling bits which are to be read in every frame. These bits are identified by the H4 path overhead byte. The clock speed for these actions is twice that of the data speed.

Figure 5A:
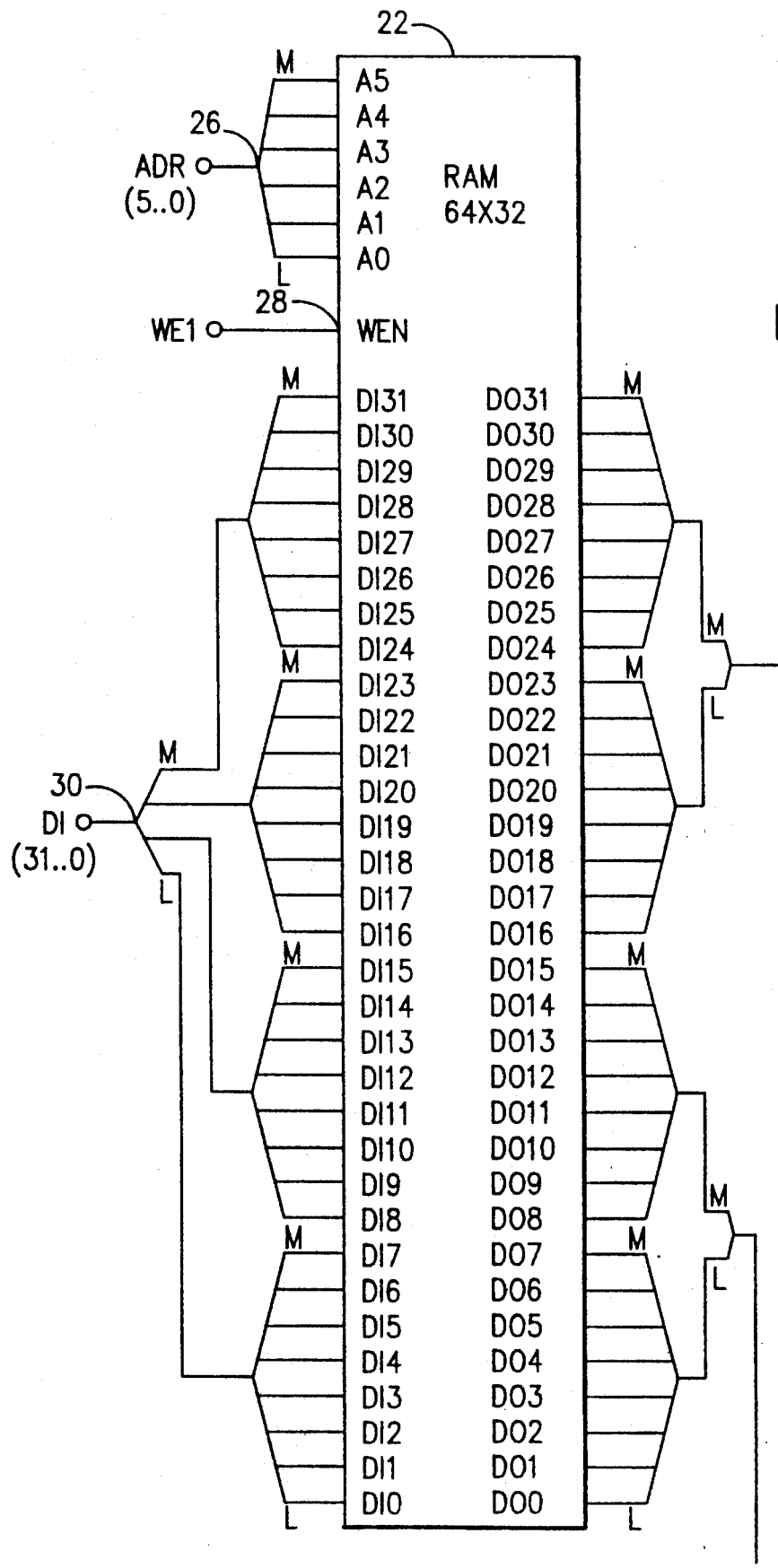
FIG. 5 shows FIGS. 5A and 5B together, which is a schematic diagram of the Random Access Memory (RAM) of the present invention.
Figure 5B:
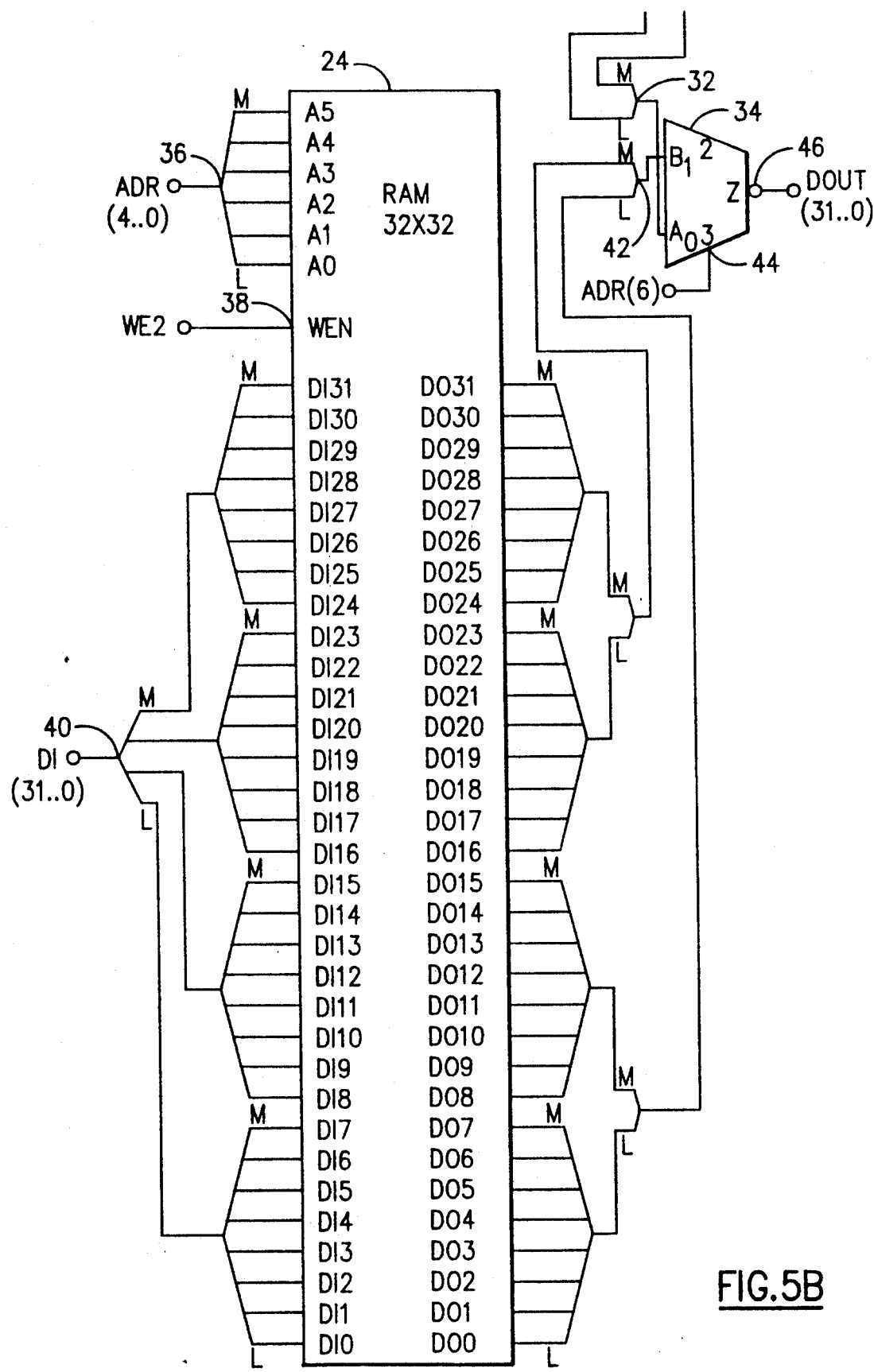

Referring to FIG. 5, there is shown a schematic diagram of the RAM circuit comprising a standard 64×32 RAM 22 and a standard 32×32 RAM 24, which provide a total of 3,072 bits of storage. RAM 22 includes six address inputs 26, a write-enable input 28, and 32 data inputs fed by a parallel bus 30 for receiving 32 bits of signal information. RAM 22 includes 32 outputs provided on an output bus 32 to a 32-bit multiplexer 34. RAM 24 includes five address inputs 36, a write-enable input 38 and 32 data inputs provided on a parallel bus 40 for receiving the signaling bits. RAM 24 provides 32 parallel outputs on a bus 42 provided to a second input of multiplexer 34. Multiplexer 34 has an input 44 for receiving the most significant address bit of the addresses provided to the RAM 10 and is controlled thereby to select outputs from either RAM 22 or 24 and to provide a 32-bit wide output 46 providing 32 signaling bits. The write-enable inputs 28 and 38 are separate, so that separate write strobes are provided to prevent writing in both RAMs at the same time. Address inputs 26 and 36 are connected to a 7-bit wide address bus 48 shown in FIG. 4, with address input 26 receiving bits 0-5, while address input 36 receives bits 0-4. In a like manner, the data inputs provided on input bus 30 and 40 are connected to a 32-bit input bus 50 shown in FIG. 4.

Figures 1, 2:
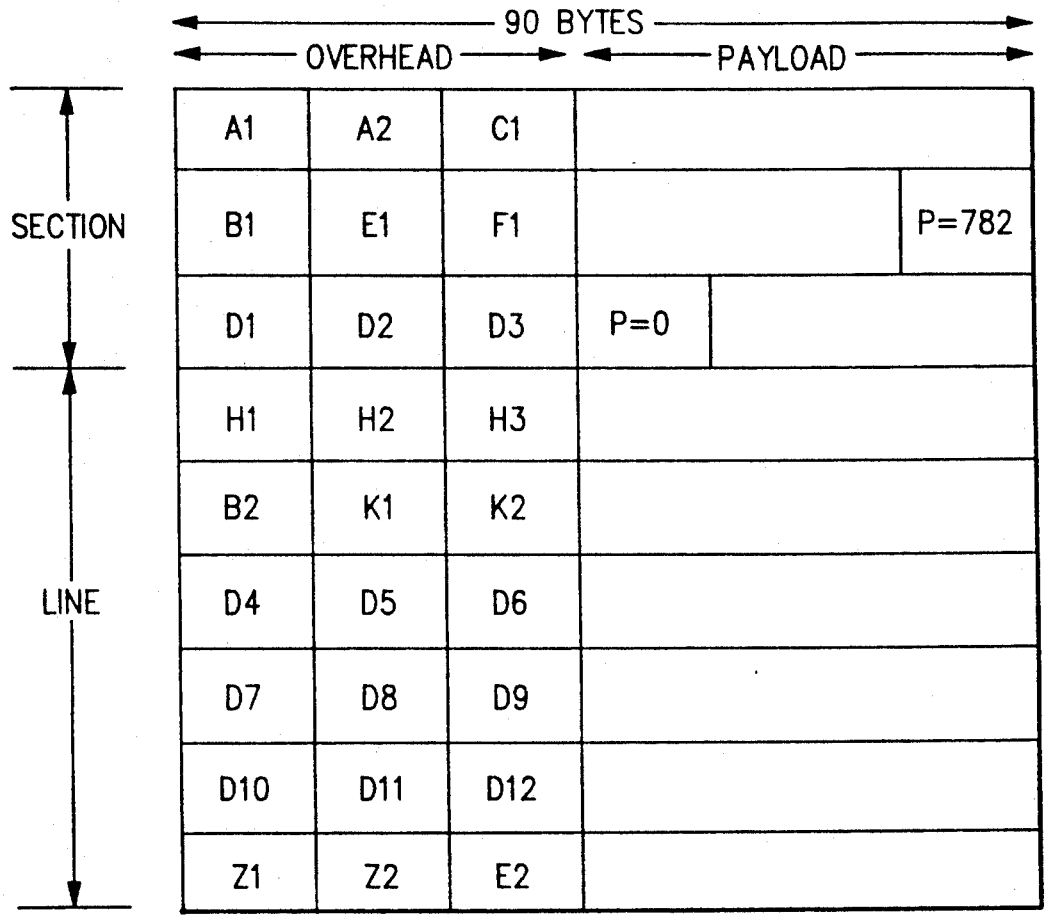
FIG. 1 shows the format of an STS-1 SONET frame.
FIG. 2 shows the payload mapping of a DS1 transmission line.
Figure 3B:
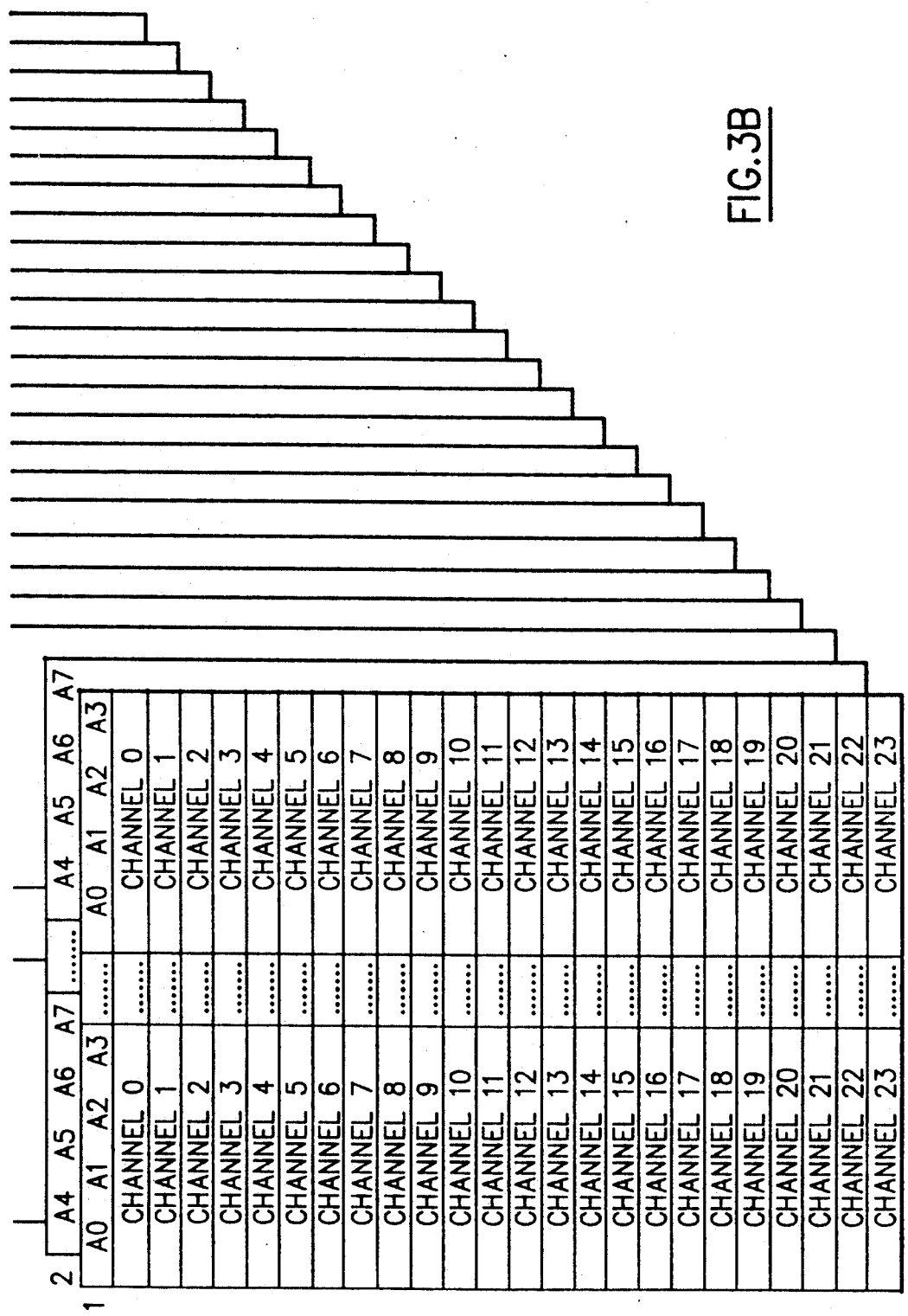
FIG. 3 shows FIGS. 3A and 3B together, which shows a portion of a SONET Synchronous Payload Envelope (SPE) and the relationship of signal bits to sequential SONET frames.

The RAM write operation is performed only during the transmission of the signaling rows of SONET frames shown in FIG. 3, through the use of a read-modify-write cycle. Because of this cycle and the fact that two bytes of signaling data are updated in the RAM simultaneously, the write strobe and write addresses are delayed by two bytes, and the write enable is generated during an odd tributary address. The addresses remain stable for a period covering one even-numbered and one odd-numbered tributary, thus allowing the use of four clock periods to complete the read-modify-write operation. The write-enable is active for the third of these clock periods and is generated synchronously.

The RAM read operation does not require the two extra clock periods, and the read addresses are active during the entire frame and are not delayed.

Figures 7, 7A:
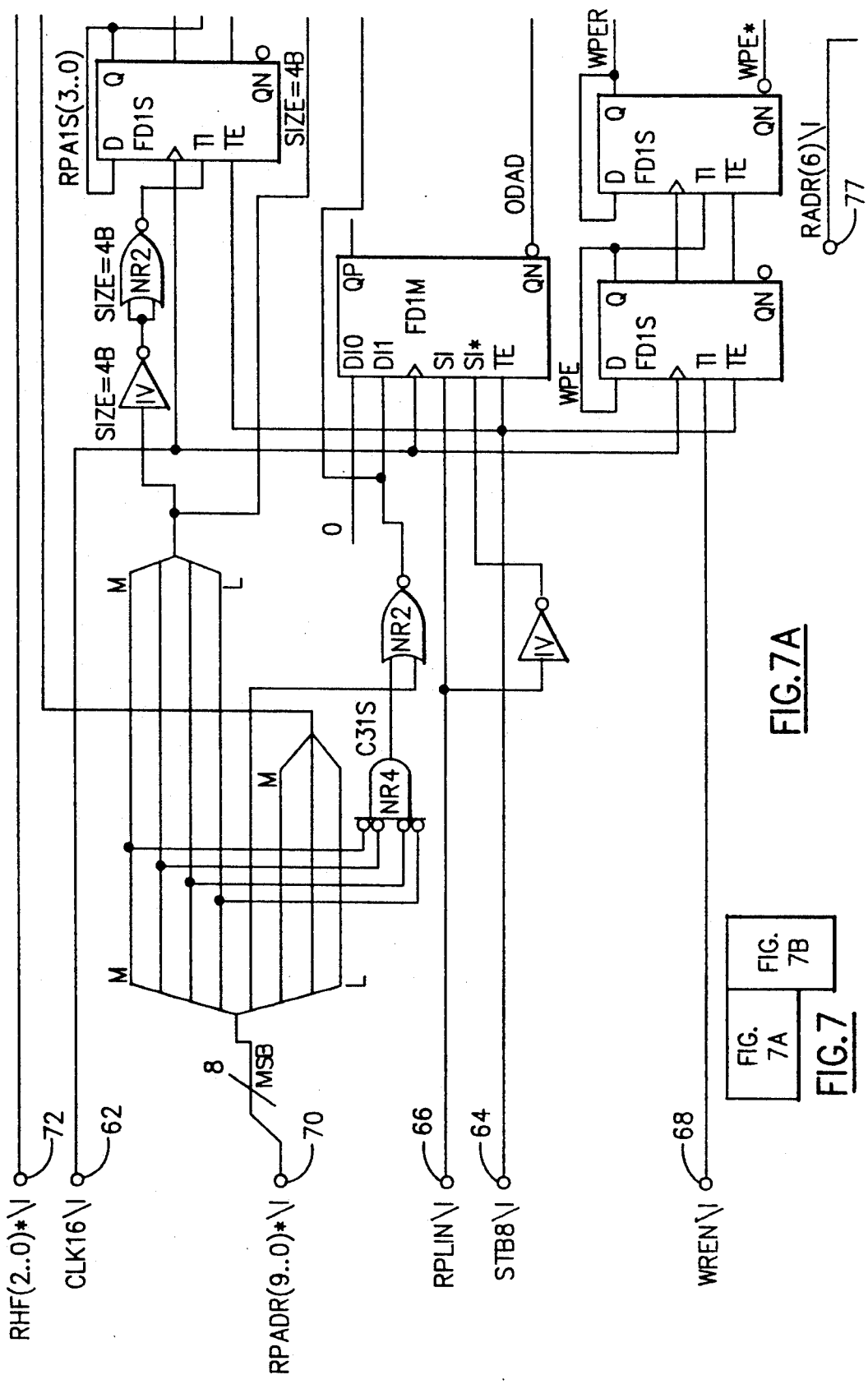
FIG. 7 shows FIGS. 7A and 7B together, which is a schematic diagram of a RAM control circuit.
Figure 7B:
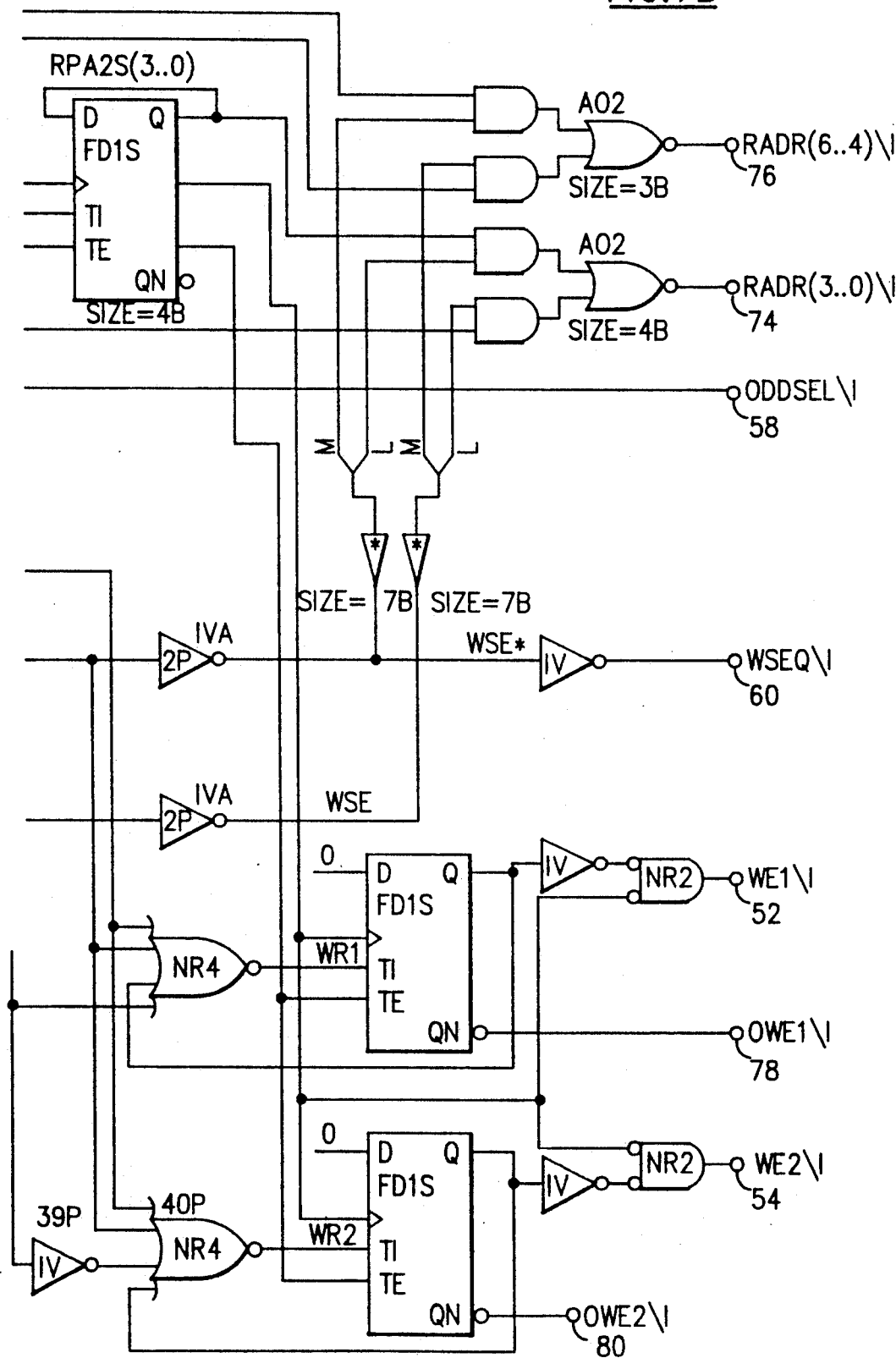

The RAM control circuit 12 is shown in FIG. 7 and provides the write-enable signals WE1 and WE2 at outputs 52 and 54 for connection to the inputs 28 and 38 respectively of RAM 10. An output bus 56 of FIG. 4 provides seven parallel address bits. An output 58 provides an odd select signal, ODDSEL based on address information, while an output 60 provides a write sequence signal, WSEQ, derived from a write enable signal that is delayed for two byte times. The RAM control circuit 12 includes a plurality of inputs for receiving signals, including input 62 for receiving a 16-MHz clock signal, an input 64 for receiving an 8-MHZ clock signal, and an input 66 for receiving a payload indicator signal indicating that the SPE bytes are being received, as opposed to SONET overhead bytes. An input 68 receives a write-enable signal which is derived from address information in another circuit. Input 70 receives ten inverted bits of address data corresponding to the byte location in the SPE.

Input 72 receives the three least significant used bits from the H4 path overhead byte which provides multiframe indications and frame phase. The three bits are bits 0, 4 and 5; bits 1, 2 and 3 are used for the European standard 2 μm sec signaling cycle.

Referring to both FIGS. 4 and 7, the output bus 56 of the RAM control circuit 12 provides seven address bits which are provided by outputs 74 and 76 shown in FIG. 7 which are combined into a single bus. Outputs 78 and 80 of FIG. 7 are not used. Input 77 is connected to output 76 to receive the most significant bit therefrom, i.e., bit 6. The detailed structure of the logic circuitry in FIG. 7 will not be described, since its implementation would be obvious to one skilled in the art having the benefit of FIG. 7. The gates shown therein are normal logic gates. The FDIM component and the FDIS component are both flip-flops.

The signaling bits associated with two tributaries that are written simultaneously are extracted from the SONET format and are provided in sets of four bits, as previously discussed. The signaling bits associated with two tributaries are stored in registers before they are loaded into the RAM. Two four-bit shift registers are used to store the even-numbered tributary signaling bits, and a third four-bit register is used to store the odd-numbered tributary signaling bits. This combination of registers is used because the transfer to the RAM occurs during receipt the odd tributary signaling bits, and the write sequence is delayed by two address cycles.

Figure 6:
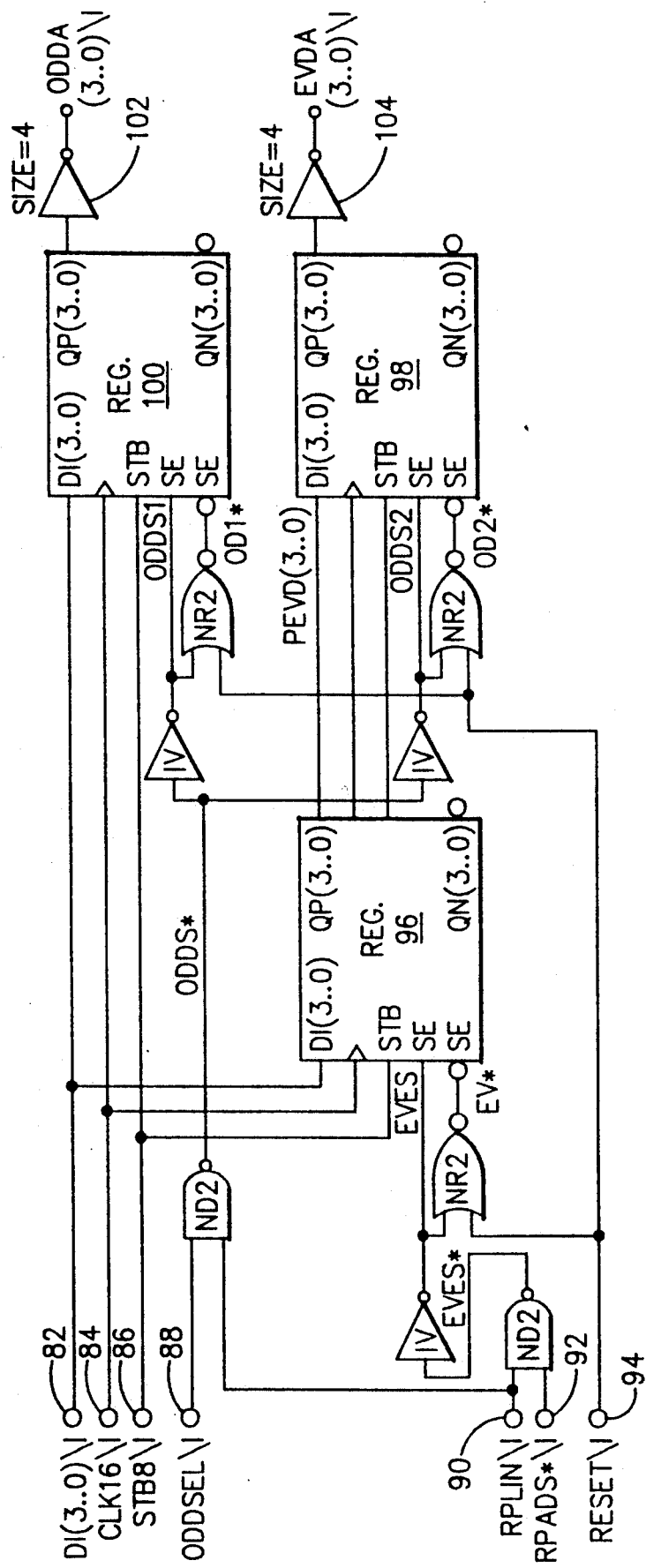
FIG. 6 is a schematic diagram showing a signaling register circuit.

The shift register circuit 14 is shown in FIG. 6 having an input 82 for receiving four signaling bits in parallel. Other inputs to the register circuit 14 include the 16-MHz clock provided at input 84, with the 8-MHz clock provided at input 86. The odd select signal provided at output 58 of controller 12 is connected to an input 88 of the register circuit 14. The payload indicator signal is provided to input 90. An input 92 receives bit 5 of the address bits provided to input 70 of the controller 12, but in an inverted state to use as an even select signal. Input 94 receives the reset signal.

The register circuit includes first and second four-bit shift registers 96 and 98 for sequentially storing the signaling bits of two consecutive even-numbered tributaries. A four-bit shift register 100 receives four signaling bits of the odd-numbered tributaries. The register circuit 14 has two outputs 102 and 104 for outputting four signaling bits in parallel for each of the odd-numbered tributaries and each of the even-numbered tributaries respectively. The details of FIG. 6 have not been described, since one skilled in the art can implement it from the details shown in the FIG.

The modify-write multiplexer circuit 16 multiplexes the signaling data for the odd- and even-numbered tributaries received from the register circuit 14 with the RAM signaling on outputs 46, so that the eight signaling bits received from the register circuit 14 are used to update eight of the 32 bits at the output of the RAM. The remaining 24 bits at the RAM output remain unchanged and are rewritten into the RAM without modification.

Figure 8A:
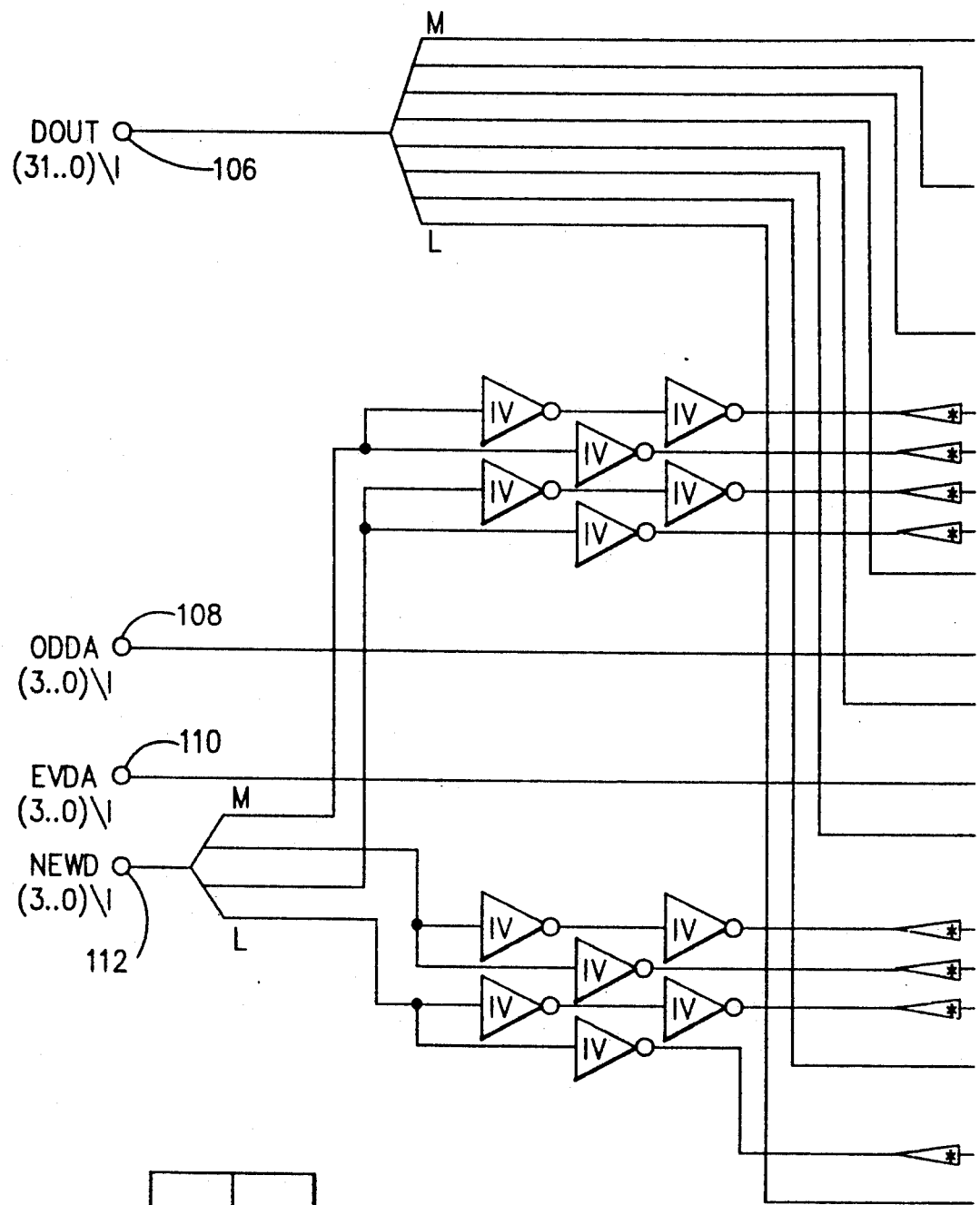
FIG. 8 shows FIGS. 8A and 8B together, which is a schematic diagram of a modify-write multiplexer.
Figure 8B:
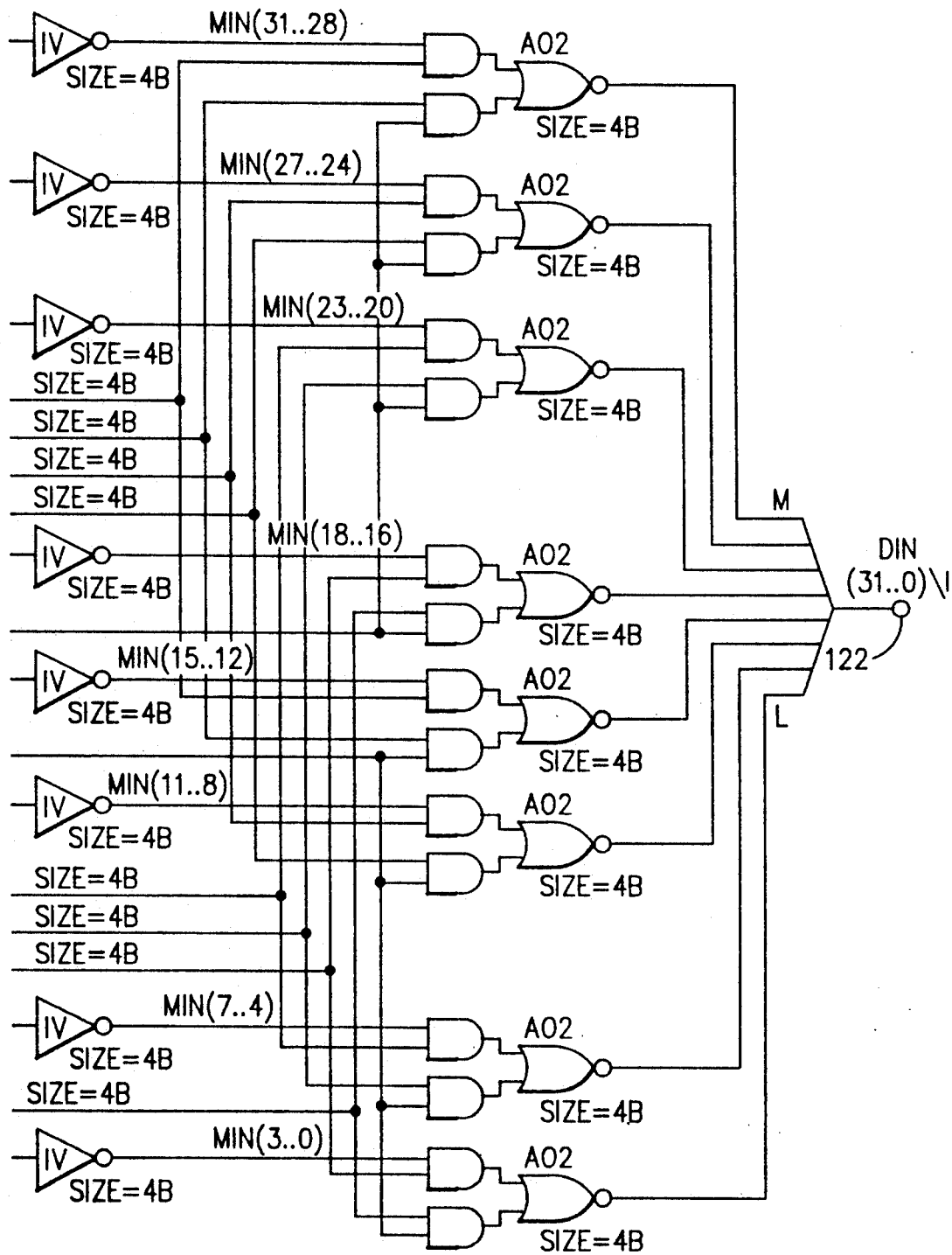

Referring to FIG. 8, there is shown a schematic diagram of the modify-write multiplexer circuit 16. The modify-write multiplexer circuit has an input 106 connected to the output 46 of RAM 10 for receiving 32 signaling bits in parallel therefrom. Another input 108 is connected to output 102 of register circuit 14 for receiving four signaling bits from an odd-numbered tributary, while an input 110 is connected to output 104 of register circuit 14 for receiving four signaling bits from an even-numbered tributary. Input 112 receives four bits of data which indicate from which portion of a SONET superframe the bits being provided on inputs 108 and 110 are from. This information is known as the superframe phase information and is derived from the H4 byte of the path overhead.

Referring to FIG. 3, it is seen that frames 1-6 of a 24-frame superframe provide A signaling bits, whereas frames 7-12 provide B signaling bits, etc. The four bits provided at input 112 indicate if the newly-arriving bits are from the portion of the superframe that is providing A, B, C or D bits. The four bits arriving at input 112 are generated by a 2-4 bit decoder 17 shown in FIG. 4, which has an output 116 connected to input 112 of modify-write multiplexer circuit 16. Decoder 17 has two inputs which are connected to the path overhead byte H4 for receiving multiframe information therefrom and in particular, the two most significant bits of the overhead byte H4.

The modify-write multiplexer circuit has an output 122 providing 32 parallel bits which are connected to input 50 of RAM 10. Thus, circuit 16 receives the 32 bits at the output of RAM 10 and eight new bits from the register circuit 14. The eight new bits are multiplexed to replace the appropriate old bits, thereby updating one-fourth of the stored bits and the modified output 122 is written back to the RAM. Thus, the signaling information stored in a RAM is continuously updated. The logic circuitry in FIG. 8 has not been described in detail, since a description would not be needed for one skilled in the art to practice the invention.

Figures 9, 9A:
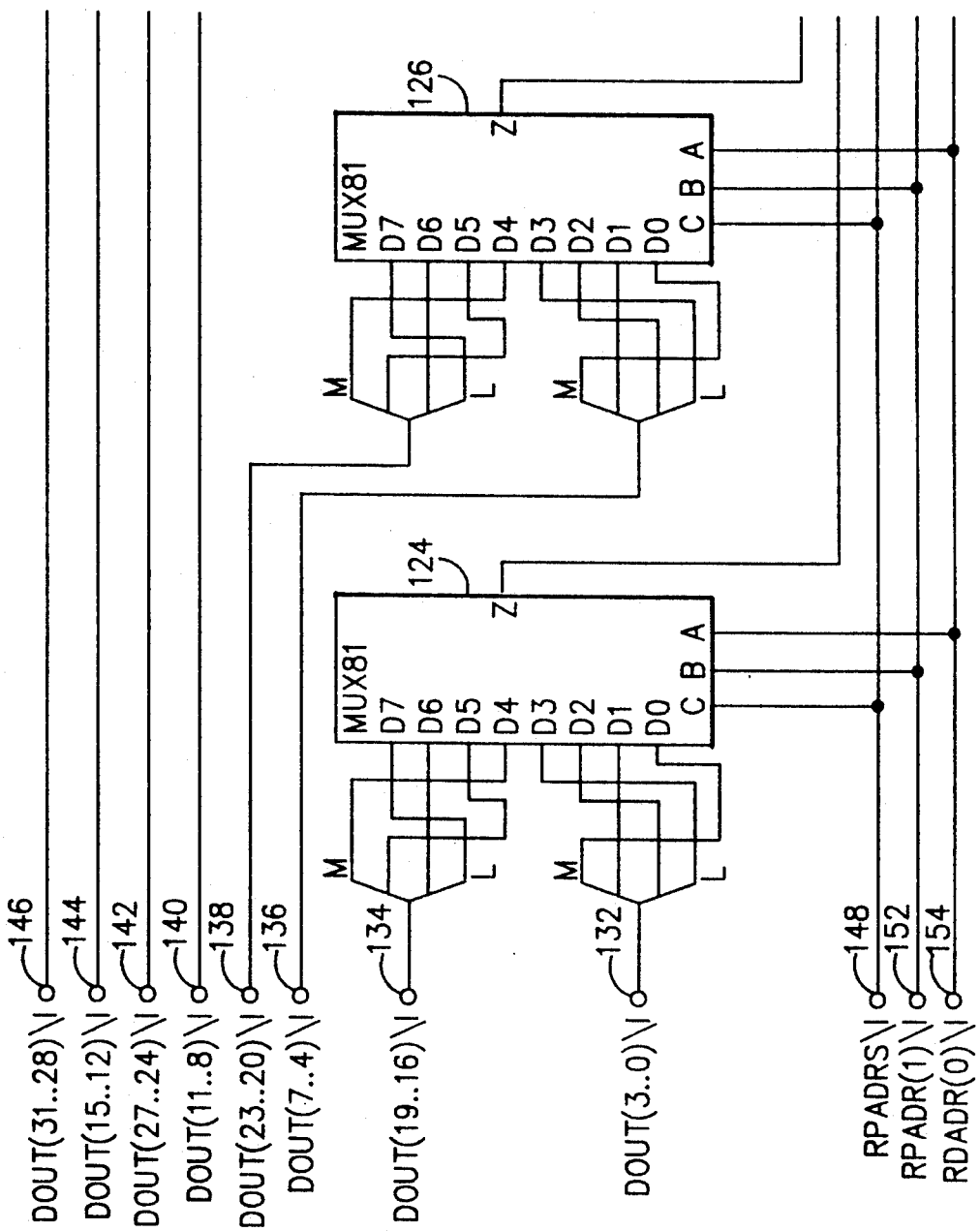
FIG. 9 shows FIGS. 9A and 9B together, which is a schematic diagram of a signaling output multiplexer circuit.

RAM 10 stores the signaling bits in a quasi-SONET format wherein four successive A bits for a particular tributary are stored together, as are four B bits, four C bits and four D bits. The object of the invention is to extract the A, B, C and D bits associated with a particular channel for a particular tributary and provide these bits on four parallel output lines. This function is accomplished in part by the multiplexer circuit 18 shown in FIG. 9. When any one particular RAM location (row) is addressed, such as address 0 shown in Table 1, eight sets of four signaling bits are provided at the RAM output. These bits represent signaling for four channels of two tributaries. Four 8:1 multiplexers 124, 126, 128 and 130 controlled by channel and tributary addresses output the desired signaling bits for a selected channel of a tributary, which can be added to the outband part of a byte carrying the channel data.

The multiplexer circuit has eight inputs 132-146, each for receiving four selected outputs 46 of RAM 10. For example, input 132 receives bits 0-3, while input 134 receives bits 16-19, which represent the A bits for channels 0-3 of an even and an odd tributary, while inputs 136 and 138 receive the B signaling bits for channels 0-3 for an even and an odd tributary.

An input 148 is connected through an inverter 150 as shown in FIG. 4 to receive address bit 5. This bit provides odd/even tributary information to the multiplexer circuit. Inputs 152 and 154 are connected to input 70 of the R,AM control 12 to receive the two least significant bits therefrom, which bits are supplied through an inverter 156 shown in FIG. 4. The multiplexer circuit has an output 158 which provides in parallel the desired A, B, C or D signaling bits for a selected channel of a selected tributary.

An example of the operation of the multiplexer circuit is as follows: When a RAM address 0 is generated, the signaling bits belonging to the channels 0-3 for tributaries 0 and 1 are at the RAM outputs. Multiplexer 124 receives A0, A1, A2 and A3 bits of tributary 0 and A0, A1, A2 and A3 bits of tributary 1 at its inputs. The bits of tributary 0 are selected for connection to the output of the multiplexer when an even tributary is indicated at input 148. The bits of tributary 1 are selected when an odd tributary is indicated at input 148. The same procedure is true for the B, C and D bits. One of the A0, A1, A2, or A3 bits is outputted in accordance with channel address information received on inputs 152 and 154, where 2 bits can be used to select one of four signaling bits.

As previously mentioned in regard to the RAM controller 12, the write sequence, WSEQ, is delayed by two byte locations so that the incoming data for two adjacent tributaries can be written simultaneously. This presents a difficulty, since the write cycle for tributaries 26 and 27 is completed during a period of time when a path overhead byte is being transmitted and during transmission of tributary 0, channel 0. Signaling for tributary 0, channel 0 will not be available at output 46 of RAM 10, since the circuit will still be modifying and writing the new signaling for tributaries 26 and 27.

Accordingly, the A, B, C and D bits belonging to tributary 0, channel 0 are stored separately in a four-bit register and multiplexed as the signaling output for tributary 0, channel 0. The tributary 0, channel 0 signaling register 20 has four inputs 160-166 connected to the data input 50 of RAM 10 for receiving bits 15, 11, 7 and 3 respectively. Other inputs include input 168 for receiving the 16-MHz clock, input 170 for receiving the 8-MHz clock, and a parallel input 172 for receiving the address bits 0-6 outputted from output 56 of the RAM controller 12. An input 174 is connected to receive the write sequence, WSEQ, from output 60 of RAM controller 12, while input 176 receives the reset signal. These inputs are connected to a four-bit register 178 having an output 180 providing four signaling bits A, B, C and D for tributary 0, channel 0.

Thus, the present invention provides a signaling translator for translating SONET-formatted signaling to a signaling format wherein the signaling bits associated with each data channel can be accessed for association with its corresponding data channel in a format used internally within an access product. All signaling bits are available for association with channel data. The storage signaling bits are constantly updated as new bits are received on the SONET format.

What is claimed is:

1. A device for interfacing a high-frequency SONET-formatted carrier, for transmitting data in channels associated with tributaries, with a lower bandwidth carrier, said device including:
    means for reading SONET-formatted signaling bits from SONET signaling bytes; and
    means for translating the SONET-formatted signaling bits into groups of signaling bits, wherein each group of signaling bits is associated with a particular transmission channel.

2. A device as described in claim 1, wherein the means for translating comprises:
    means for storing the signaling bits read from the SONET signaling bytes; and
    means for reading signaling bits associated with the particular channel from said storage means and for providing the read bits at an output.

3. A device as described in claim 1, wherein the sets of signaling bits for two consecutive tributaries are stored in the same address.

4. A device as described in claim 3, wherein the means for reading signaling bits associated with the particular channel, comprises:
    means for reading all bits stored in said one address of the storage means; and
    means for multiplying the bits read from the storage means to selected bits from one of said tributaries and bits from one of said four channels stored in said one address.

5. A device as described in claim 3, additionally comprising means for updating the signaling bits stored in said storage means.

6. A device as described in claim 5, wherein the updating means comprises:
    means for temporarily storing signaling bits read from two consecutive SONET signaling bytes representing two tributaries in the SONET transmission; and
    means for performing a read-modify-write operation on signaling bits stored in said storage means, whereby the signaling bits in a particular storage address are read, said bits are modified by the signaling bits in the temporary storing means, and the modified bits are written back into the storage means.

7. A device as described in claim 6, wherein the read-modify-write operation is delayed by two byte locations to allow for the simultaneous updating of the stored signaling bits of two sequential SONET bytes, additionally comprising:

a register circuit for storing the signaling bits for tributary 0 channel 0, so that these bits may be read out for association with data contained in tributary 0 channel 0 while a read-modify-write operation for signaling of the two highest order tributaries is being completed.

8. A device as described in claim 6, wherein the temporary storage means for signaling bits of two consecutive tributaries comprises:
    two four-bit registers for storing the signaling bits of an even tributary; and
    one four-bit register for storing the signaling bits of an odd tributary.

9. A device as described in claim 3, wherein the storage means comprises a random access memory (RAM) having a size of at east $32 \times 78$ bits.

10. A device as described in claim 9, wherein the RAM is formed of standard-sized RAM circuits to have an overall capacity of $32 \times 96$ bits.

11. A signaling translator for use in a SONET transmission system wherein data is transmitted in channels associated with tributaries, said signaling translator for translating SONETformatted signaling into a signal format, wherein the signaling bits for each channel are associated with each other, comprising:
    register means for storing signaling bits read from SONET signaling bytes;
    memory means for storing signaling bits;
    means for reading signaling bits from the memory means;
    multiplexer means for modifying the signaling bits read from the memory means with the signaling bits stored in the register means;
    means for writing the modified signaling bits back to said memory means; and
    multiplexer means for selecting bits associated with a particular tributary and channel from the signaling bits read from said memory means.

12. A signaling translator as described in claim 11, wherein the memory means stores the signaling bits in a quasi-SONET format wherein sets of four similar bits for four consecutive channels of a particular tributary are stored in one address of said storage means, whereby the write operation for writing the bits into the storage means is simplified, since the bits are stored in groups of four as read from the SONET signaling bytes.

13. A signaling translator as described in claim 11, wherein the registering means comprises two four-bit registers for storing the signaling bits of even-numbered tributaries, and a four-bit register for storing the signaling bits of an odd-numbered tributary.

14. A signaling translator as described in claim 11, wherein the multiplexing means combines the signaling bits from the register means and the signaling bits read from the memory means to update the signaling bits read from the memory means.

15. A method for use in a SONET transmission system, wherein data is transmitted in channels associated with tributaries, said method for translating SONET-formatted signaling into a signaling format wherein the signaling bits for a channel are associated with each other, comprising the steps of:
    reading the signaling bits from sequential SONET signaling bytes;
    temporarily storing said SONET signaling bits for at least two sequential signaling bytes, whereby signaling for an even- and an odd-numbered tributary is temporarily stored;

reading signaling bits from an address of a signaling storage means of the type wherein signaling bits for four channels of two adjacent tributaries are stored in a single storage address;

modifying the signaling bits read from the storage means with the signaling bits stored in the temporary storage;

writing the modified signaling bits into the storage means, so that the stored signaling bits are updated; and selecting signaling bits for a particular tributary and channel from the bits read out of an address of the storage means, whereby four signaling bits associated with a particular channel are read from the storage means.

16. A device for interfacing a high-frequency SONET-formatted carrier, for transmitting data in channels associated with tributaries, with a lower bandwidth carrier, said device including:

means for reading SONET-formatted signaling bits from SONET signaling bytes;

means for storing the SONET-formatted signaling bits read from the SONET signaling bytes, said means storing the bits in quasi-SONET format, wherein sets of four similar bits for four consecutive channels of a particular tributary are stored in one address of said storage means, so that the write operation for writing the bits into the storage means is simplified, since the bits are stored in sets of four as read from the SONET signaling bytes; and means for reading signaling bits associated with the particular channel from said storage means and for providing the read bits at an output, whereby the SONET-formatted signaling bits are translated into groups of signaling bits wherein each group of signaling bits is associated with a particular transmission channel.

17. A device as described in claim 1, wherein the means for translating comprises:

means for storing the signaling bits read from the SONET signaling bytes, wherein sets of similar bits are stored together so that the write operation for writing the bits into the storage is simplified; and means for reading signaling bits associated from the particular channel from said storage means and for providing the read bits at an output.

* * * * *

UNITED STATES PATENT AND TRADEMARK OFFICE
CERTIFICATE OF CORRECTION

PATENT NO. : 5,134,614
DATED : July 28, 1992
INVENTOR(S) : Baydar et al

It is certified that error appears in the above-identified patent and that said Letters Patent is hereby corrected as shown below:

At column 13, line 44, please change "multiplying" to --multiplexing--.

At column 14, line 16, please change "east" to --least--; and at line 23, please insert a hyphen between "SONET" and "formatted".

Signed and Sealed this

Twenty-third Day of August, 1994

Attest:

BRUCE LEHMAN

Attesting Officer      Commissioner of Patents and Trademarks